Patented Nov. 10, 1953

2,658,846

UNITED STATES PATENT OFFICE 2,658,846

SOLDERING FLUX

John A. De Rosa, Brooklyn, and Chester A. Snell, New York, N. Y., assignors to the United States of America as represented by the Secretary of the Army No Drawing. Application December 12, 1951, Serial No. 261,365

3 Claims. (Cl. 148—25)

This invention relates to soldering fluxes and more particularly to paste fluxes for soft soldering.

The use of a flux for soldering purposes in paste form is desirable in many instances to permit greater convenience and ease in applying the solder than can be obtained with either dry or liquid flux, particularly in soft soldering.

The primary object of the invention is to provide a soldering flux that is particularly adaptable for use in soft soldering on stainless steel.

The present invention is based upon the discovery that the soldering properties of lanolin, which has some soldering activity on copper, brass and tinplate, can be enhanced in incorporating into a paste base of lanolin certain organic derivatives of phosphoric acid. Examples of specific organic derivatives of phosphoric acid found to be most useful in furnishing such advantages are monoamyl acid orthophosphate ($C_5H_{11}H_2PO_4$) and monoamyl orthophosphoric acid ($C_5H_{11}H_2PO_4H_3PO_4$).

Examples of particular fluxes embodying the specific advantages hereinbefore set forth are given below.

| Number | Composition | Parts by weight |
|--------|-------------|-----------------|
| I | {Lanolin, anhydrous<br>Monoamyl Acid Orthophosphate | 70<br>30 |
| II | {Lanolin, anhydrous<br>Monoamyl Orthophosphoric Acid | 80<br>20 |

The soldering fluxes set forth above are generally prepared by melting the lanolin paste base and incorporating either the monoamyl acid orthophosphate or the monoamyl orthophosphoric acid into the melted paste base. Both the paste base and the active ingredients are relatively miscible with each other. As the mixtures cool, they are occasionally stirred. The resulting paste fluxes are of such a viscosity that no flow occurs from their containers.

While there have been described what at present are considered to be the preferred embodiments of the invention, it will be understood by those skilled in the art that various changes and modifications may be made herein without departing from the invention and it is, therefore, aimed in the appended claims to cover all such modifications as fall within the spirit and scope of the invention.

What is claimed is:

1. A soldering flux comprised substantially of 70 parts by weight of lanolin and 30 parts by weight of monoamyl acid orthophosphate.

2. A soldering flux comprised substantially of 80 parts by weight of lanolin and 20 parts by weight of monoamyl orthophosphoric acid.

3. A soldering flux comprising in combination 70–80 parts by weight of lanolin and 20–30 parts by weight of a compound selected from the group consisting of monoamyl acid orthophosphate and monoamyl orthophosphoric acid.

JOHN A. DE ROSA.
CHESTER A. SNELL.

References Cited in the file of this patent

UNITED STATES PATENTS

| Number | Name | Date |
|--------|------|------|
| 1,882,567 | Saukaitis | Oct. 11, 1932 |

FOREIGN PATENTS

| Number | Country | Date |
|--------|---------|------|
| 400,609 | Great Britain | Oct. 23, 1933 |